May 13, 1969 A. J. SKALKA 3,443,437
GRAIN BIN FILL GAUGE WITH PADDLE ACTUATORS
Filed Feb. 16, 1967 Sheet 2 of 2
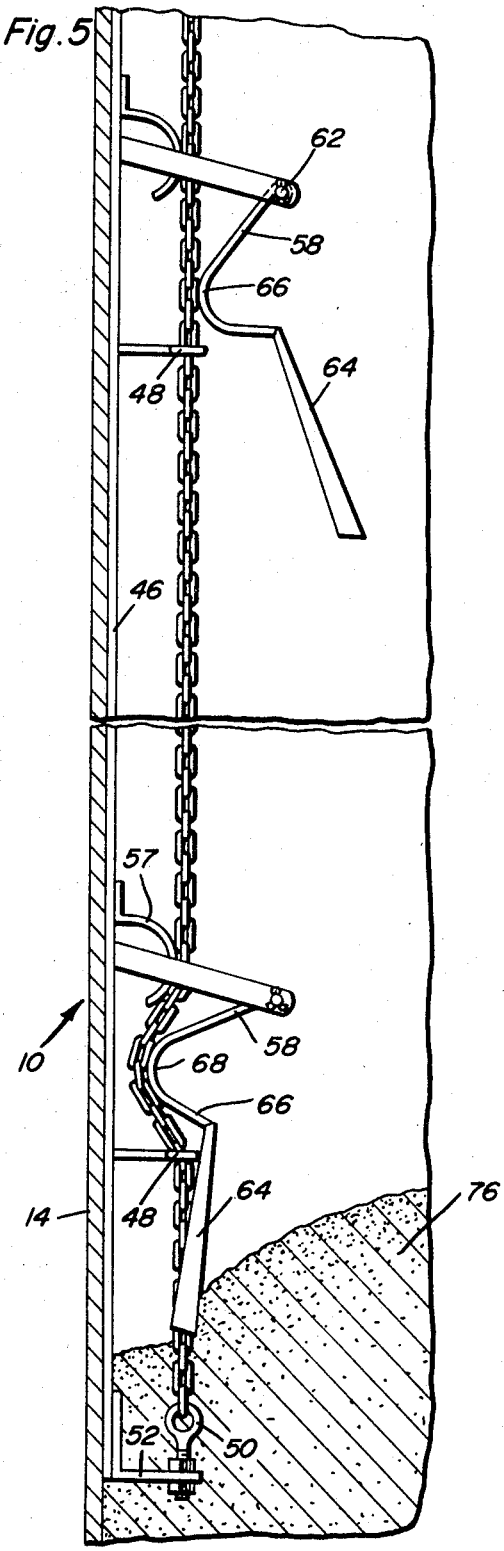
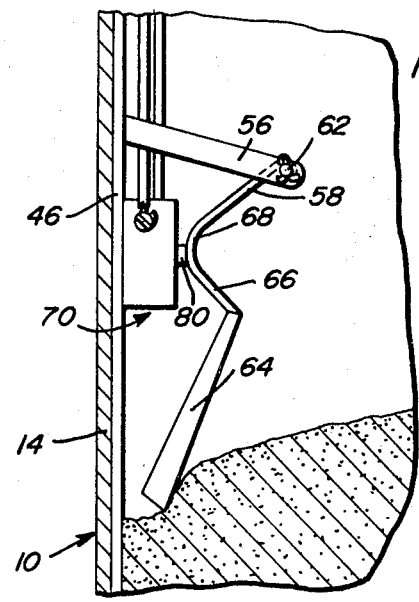
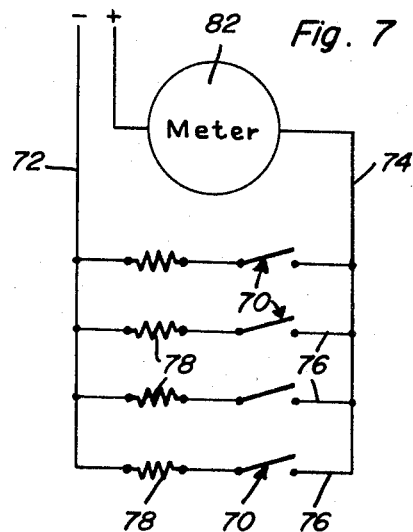
Albert J. Skalka
INVENTOR.

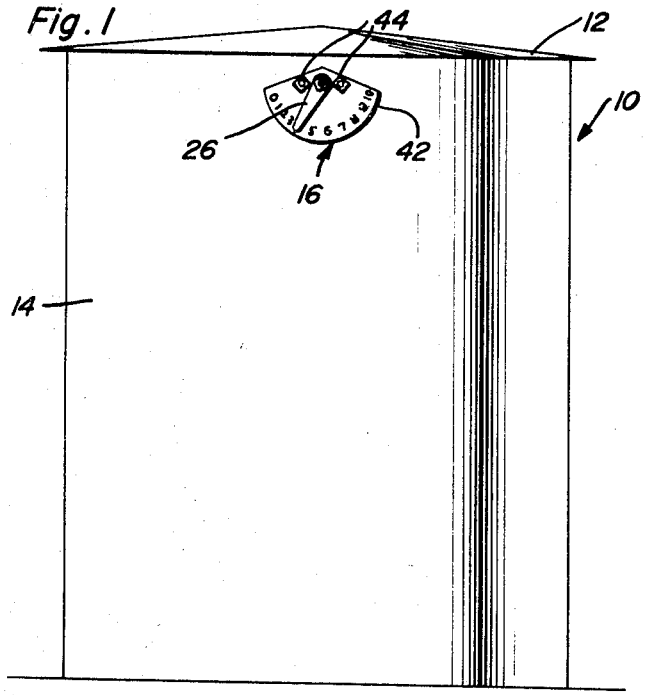
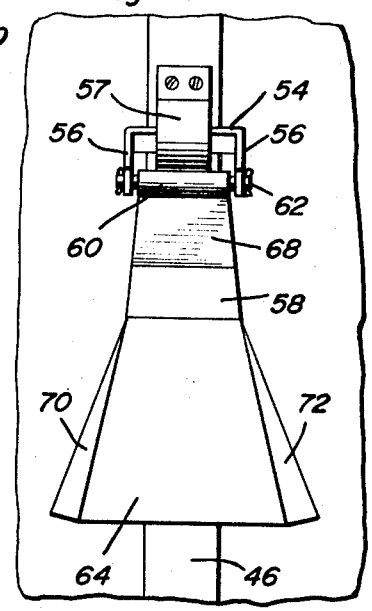
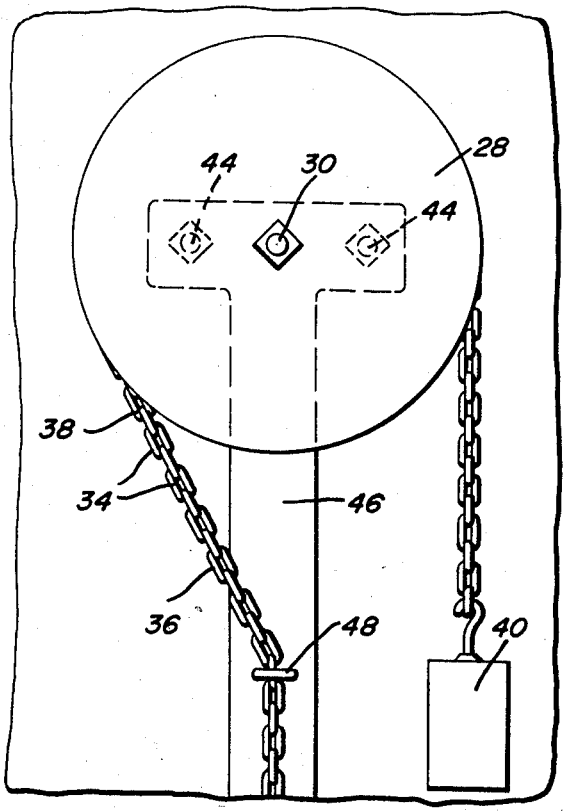
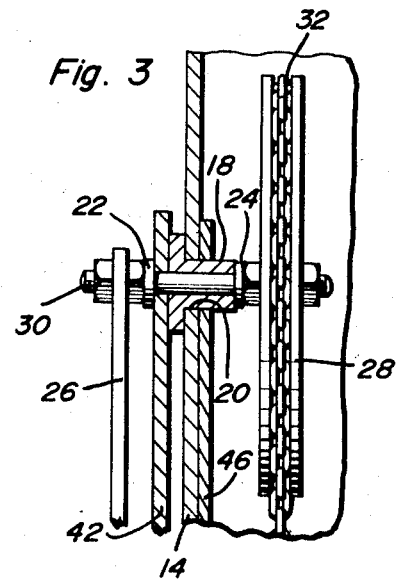
Albert J. Skalka
INVENTOR.

United States Patent Office 3,443,437
Patented May 13, 1969

3,443,437
GRAIN BIN FILL GAUGE WITH PADDLE ACTUATORS
Albert J. Skalka, Deweese, Nebr. 68934
Filed Feb. 16, 1967, Ser. No. 616,517
Int. Cl. G01f 23/00
U.S. Cl. 73—290                                          4 Claims

ABSTRACT OF THE DISCLOSURE

An assemblage for use in conjunction with a grain bin and operable to render a visual indication of the amount of grain within the bin and consisting of a plurality of pivotally supported paddle members disposed at spaced elevations within the bin and adapted to be pivoted from inactive positions to active positions in response to the level of the grain within the bin being elevated to the levels of the paddles, the grain bin fill gauge including indicating means operative to vary the indication given thereby as the level of grain within the bin is raised or lowered past the paddles.

---

The main object of this invention is to provide a grain bin fill gauge capable of being installed within substantially any grain bin and which will thereafter be operative to render a visual indication of the amount of grain within the bin.

Another object of this invention, in accordance with the immediately preceding object, is to provide a gauge that will adapt itself for ready mounting in substantially any grain bin.

Yet another object of this invention is to provide a fill gauge in the form of a mechanically actuated embodiment whereby no external power source is required.

A further object of this invention is to provide a fill gauge in the form of an electrically actuatable embodiment requiring the presence of a source of electrical potential but which may be utilized to render its indication of the amount of grain in an associated bin at a remote location.

A final object of this invention to be specifically enumerated herein is to provide a grain bin fill gauge which will conform to conventional forms of manufacture, be of simple construction and easy to use so as to provide a device that will be economically feasible, long lasting and relatively troublefree in operation.

These together with other objects and adavntages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a grain bin with which the mechanical form of fill gauge of the instant invention has been operatively associated;

FIGURE 2 is a fragmentary enlarged elevational view of the portion of the grain bin in FIGURE 1 from which the indicating means of the fill gauge is supported and as seen from the inside thereof;

FIGURE 3 is a fragmentary vertical sectional view taken substantially upon a plane passing through the center of the structural assemblage illustrated in FIGURE 2 and as seen from the left side thereof;

FIGURE 4 is a fragmentary elevational view of a lower portion of the grain bin from which one of the paddle members of the mechanical form of gauge is pivotally supported and with the tension chain removed;

FIGURE 5 is a fragmentary vertical sectional view taken through the wall of the grain bin and illustrating the manner in which the chain tension member may be laterally deflected by one of the paddle members so as to vary the indication rendered by the indicating portion of the mechanical form of fill gauge;

FIGURE 6 is a fragmentary vertical sectional view similar to FIGURE 5 but illustrating the manner in which the paddle member may also be utilized to actuate one of the switches of the electrical form of grain bin fill gauge; and FIGURE 7 is a diagrammatic view of the wiring circuitry of the electrically actuated form of fill gauge.

Referring now more specifically to the drawings the numeral 10 generally designates an upstanding grain bin including a roof structure 12 and cylindrical wall portions 14.

The mechanical form of grain bin fill gauge of the instant invention is generally referred to by the reference numeral 16 and includes a flanged sleeve 18 secured through an opening 20 formed in an upper portion of the cylindrical wall portion 14 of the bin 10. A pivot shaft is secured through the sleeve 18 and includes thrust washers 22 and 24 and has a pointer 26 secured on the end portion thereof disposed outwardly of the cylindrical wall portion 14. In addition, a pulley wheel 28 is mounted on the inner end of the pivot shaft 30 and it may be noted that the pulley wheel 28 may include a center groove 32 including circumferentially spaced recesses for receiving and keying with alternate links 34 of the upper end portion 36 of an elongated and flexible tension chain 38 which is passed over the pulley wheel 28 and has a weight 40 secured to its free end portion.

A sector plate 42 is disposed on the pivot shaft 30 inwardly of the pointer 26 and is fixed in position relative to the cylindrical wall portion 14 by means of suitable fasteners 44 secured through the sector plate 42 and the cylindrical wall portion 14. In addition, the gauge 16 also includes a vertical reinforcing strap 46 whose upper end is secured to the inner surface of the cylindrical wall portion 14 about the sleeve 18 by means of the fasteners 44 and which includes, at points spaced vertically therealong, inwardly projecting eye members 48 through which the lower end portion of the tension chain 38 is slidably received, the lower terminal end portion of the tension chain 38 being anchored to an eye member 50 suitably supported from a bracket 52 carried by the inner surface of the cylindrical wall portion 14 adjacent its lower end.

A plurality of generally U-shaped pivot brackets 54 including spaced parallel legs 56 are supported from the reinforcing strap or strip 46 at predetermined points spaced vertically therealong between adjacent eye members 48. The legs 56 of each support bracket 54 embracingly receive therebetween the tension chain 38 and each of the brackets 54 is positioned slightly above one of the eye members 48 and below a corresponding abutment 57 also supported from the strip 46.

A plurality of paddle levers 58 are provided and corresponding ends of the levers 58 include transverse sleeves 60 through which pivot pins 62 secured between the free end portions of corresponding pairs of legs 56 are rotatably received. In this manner, the paddle levers 58 are pivotally supported from the support brackets 54 for swinging movement about horizontal axes spaced vertically along the cylindrical wall portion 14. The levers 58 hang downwardly and their lower end portions include paddle portions 64 which, when the levers 58 are hanging freely, are slightly inwardly and downwardly inclined. However, the upper end portions of each of the paddle levers 58 include a U-shaped portion 66 whose bight portion 68 projects laterally outwardly of the plane in which the paddle lever 58 hangs and which is engageable with the tension chain 38 in the manner illustrated in FIG- URE 5 of the drawings to laterally deflect the chain 38 whenever the paddle lever 58 is in the position thereof illustrated in the lower portion of FIGURE 5.

Each of the paddle portions 64 is in the form of an upwardly tapering and outwardly opening channel member including divergent side flange portions 70 and 72. This configuration of paddle portion enables the grain 76 within the bin 10 to fall downwardly along the angle of repose of the grain 76 as the bin 10 is being filled and urge the lower end portions of the paddle portions 64 toward the cylindrical wall portion 14 thereby swinging the paddle portions 64 from the position thereof illustrated in the upper portion of FIGURE 5 to the position thereof illustrated in the lower portion of FIGURE 5 so as to laterally deflect the adjacent portion of the tension chain 38. Of course, each time the tension chain 38 is laterally deflected by one of the bight portions 68, the pulley wheel 28 is slightly rotated in a counterclockwise direction as viewed in FIGURE 2 of the drawings so as to swing the pointer 26 slightly in a clockwise direction as seen in FIGURE 1 of the drawings. Of course, should the level of grain 76 within the bin 10 be lowered successively below the vertically spaced paddle portions 64, the paddle levers 58 will be successively freed to hang in the positions thereof illustrated in FIGURE 5 of the drawings whereby the adjacent portions of the tension chain 38 will be straightened and thus the pointer 26 will swing in a counterclockwise direction as viewed in FIGURE 1 of the drawings.

The weight 40 is of course greater than the weight of the chain 38 and, if it is desired not to use the weight 40, the free upper end of the chain 38 may be secured to the pulley wheel 28 and a torsion spring may be secured between the pulley wheel 28 and the bin 10 so as to yieldingly urge the pulley wheel 28 to rotate in a clockwise direction as viewed in FIGURE 2 of the drawings.

With attention now directed more specifically to FIGURES 6 and 7 of the drawings there may be seen a modified form of the invention which, in lieu of the tension chain 38 and pointer 26, utilizes a plurality of switch assemblies generally referred to by the reference numerals 70 connected in parallel across a pair of conductors 72 and 74 by means of a plurality of branch conductors 76 having electrical resistance elements 78 serially connected therein. Accordingly, each time one of the switch assemblies 70 is closed by the bight portion 68 of an associated paddle lever 58 pushing inwardly on the switch actuator 80 the corresponding electrical resistance element 78 is connected between the conductors 72 and 74 and the value of total resistance is registered on a meter 82 serially connected in the conductor 74. Therefore, as the grain bit 10, when equipped with the embodiment of the invention illustrated in FIGURES 6 and 7, is filled, the switches 70 will be successively closed and the electrical resistance elements 78 will be successively connected across the conductors 72 and 74 and thereby cause the meter 82 to sequentially read a higher resistance value when the conductors 72 and 74 are connected to a suitable source of electrical potential, it being understood that a suitable manual control switch for activating and deactivating the circuitry illustrated in FIGURE 7 of the drawings may be interposed in either of the conductors 72 and 74 in order that the meter 82 will be rendered operative only when desired. Of course, when the embodiment of the invention illustrated in FIGURES 6 and 7 is utilized, the eye members 48 and 50 need not be present.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. In combination, a bin for fluent granular material including one upstanding wall portion, a plurality of fluent granular material level sensing means mounted in said bin at different elevations therein for movement between active and inactive positions, yieldingly urged toward their inactive positions and adapted to be moved by said fluent granular material to said active positions upon the level of said granular material reaching said different elevations, and indicating means with which said level sensing means are operatively associated and operative, in response to said sensing means being sequentially shifted to said active and inactive positions, to indicate, respectively, progressively increasing and decreasing amounts of granular material as being in said bin, vertically spaced and inwardly projecting brackets secured to said upstanding wall portion, said material level sensing means including an upstanding elongated lever pivotally secured at its upper end to each of the inner end portions of said brackets for oscillation about a horizontal axis extending generally normal to a horizontal line passing through said bracket and the center of said bin, each of said levers including a panel-like paddle member on its lower end disposed generally normal to said line, said levers each including outwardly bowed portions intermediate the respective axis of oscillation and paddle member, whereby the outer sides of said levers will be eccentrically weighted and the latter will hang by gravity in slightly downwardly and inclined positions, said indicating means including actuator portions thereof spaced outwardly of the outermost portions of said bowed portions and inwardly of said upstanding wall portion, shiftable generally horizontally between outer active and inner inactive positions, yieldingly urged toward inner inactive positions, and engageable by said outermost portions of said bowed portions for shifting to the outer active positions in response to outward swinging of the lower ends of said levers effected by side pressure of granular material on the inner sides of the paddle members in response to the granular material flowing downwardly along its angle of repose as the bin is being filled from the top thereof.

2. The combination of claim 1 wherein said indicating means includes an upstanding tension member disposed in said bin inwardly of said wall portion and including upper and lower end portions, one of said end portions being anchored in said bin against vertical shifting therein and the other end portion of said tension member being supported in said bin for movement toward and away from said one end portion and yieldingly urged away from said one end portion, said indicating means including indicating means operable to render a variable reading as said other end portion is shifted toward and away from said one end portion, said bin including guide means spaced vertically along said tension member and guidingly engaging the latter at points spaced therealong, said lever outermost portions being shiftable to positions engaging and laterally deflecting said tension member between corresponding pairs of adjacent guide means upon outward swinging movement of the lower ends of said levers.

3. The combination of claim 1 wherein said indicating means includes an upstanding tension member disposed in said bin inwardly of said wall portion and including upper and lower end portions, one of said end portions being anchored in said bin against vertical shifting therein and the other end portion of said tension member being supported in said bin for movement toward and away from said one end portion and yieldingly urged away from said one end portion, said indicating means including indicating means operable to render a variable reading as said other end portion is shifted toward and away from said one end portion, said other end of said tension member comprising the upper end thereof and being passed over a pulley journaled from an upper portion of said bin, the free terminal upper end of said tension member hanging downward from said pulley and having a weight attached thereto, said indicating means being mounted for rotation with said pulley, said lever outermost portions being shiftable to positions engaging and laterally deflecting said tension member between corresponding pairs of adjacent guide means upon outward swinging movement of the lower ends of said levers.

4. The combination of claim 1 wherein said indicating means includes an electrical resistance indicating meter, an electrical circuit in which said meter is electrically connected, a plurality of electrical resistance members and a plurality of corresponding electrical switches each including one of said actuator portions, said electrical switches and resistance members being electrically connected in said circuit for loading said circuit with resistance equal in value to the resistance values of said resistance members upon the closing of the corresponding switches, said lever outermost portions being shiftable to positions engaging and shifting said actuator portions to said active positions upon outward swinging movement of the lower ends of said levers.

References Cited

UNITED STATES PATENTS

| 831,911 | 2/1906 | Versteeg | 340—246 |
| 848,519 | 3/1907 | Versteeg | 340—246 |
| 2,713,793 | 7/1955 | Andersen | 73—301 |

FOREIGN PATENTS 55,748  10/1935  Norway.

LOUIS R. PRINCE, *Primary Examiner.*

D. O. WOODIEL, *Assistant Examiner.*

U.S. Cl. X.R.

73—313